(12) United States Patent
Holtmanns et al.

(10) Patent No.: US 8,943,321 B2
(45) Date of Patent: Jan. 27, 2015

(54) USER IDENTITY MANAGEMENT FOR PERMITTING INTERWORKING OF A BOOTSTRAPPING ARCHITECTURE AND A SHARED IDENTITY SERVICE

(75) Inventors: Silke Holtmanns, Klaukkala (FI); Hannes Tschofenig, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/500,491

(22) PCT Filed: Oct. 19, 2010

(86) PCT No.: PCT/IB2010/054736
§ 371 (c)(1),
(2), (4) Date: Apr. 5, 2012

(87) PCT Pub. No.: WO2011/048551
PCT Pub. Date: Apr. 28, 2011

(65) Prior Publication Data
US 2012/0204231 A1      Aug. 9, 2012

Related U.S. Application Data

(60) Provisional application No. 61/252,918, filed on Oct. 19, 2009.

(51) Int. Cl.
*H04L 29/06* (2006.01)
*H04W 12/06* (2009.01)
*H04W 12/04* (2009.01)

(52) U.S. Cl.
CPC .............. *H04W 12/04* (2013.01); *H04W 12/06* (2013.01); *H04L 63/0815* (2013.01)
USPC ........................................................ 713/171

(58) Field of Classification Search
CPC .................................................. H04L 63/0815
USPC ........................................................ 713/171
See application file for complete search history.

(56) References Cited

U.S. PATENT DOCUMENTS 7,984,298 B2 * 7/2011 Wei et al. ...................... 713/171
2006/0205388 A1   9/2006 Semple et al.
(Continued)

FOREIGN PATENT DOCUMENTS

| CN | 101160779 A | 4/2008 |
|----|---|---|
| WO | WO-2006084183 A1 | 8/2006 |
| WO | WO-2007085175 A1 | 8/2007 |

OTHER PUBLICATIONS

International Search Report dated Jan. 25, 2011 for PCT application No. PCT/IB2010/054736.
(Continued)

*Primary Examiner* — Pramila Parthasarathy
(74) *Attorney, Agent, or Firm* — Mintz, Levin, Cohn, Ferris, Glovsky & Popeo, P.C.

(57) ABSTRACT

A method, apparatus and computer program product are provided to facilitate authentication of a request, such as by a mobile terminal, while also supplying information about the user to a service, website, application or the like A method, apparatus and computer program product may provide for interworking a bootstrapping architecture, such as Generic Bootstrapping Architecture, and a shared identity service, such as OpenID architecture In this regard, a method, apparatus and computer program product may provide for a secure session with a service provider through Generic Bootstrapping Architecture while being able to supply the service provider with the user information and/or accessing a user account using OpenID architecture.

17 Claims, 9 Drawing Sheets

(56) References Cited

U.S. PATENT DOCUMENTS

2007/0204160 A1    8/2007   Chan et al.
2007/0208936 A1    9/2007   Ramos Robles
2009/0119763 A1    5/2009   Park et al.

OTHER PUBLICATIONS

3GPP TR 33.924 (V.2.0.0), "3rd Generation Partnership Project; Technical Specification Group Services and System Aspects; Identity Management and 3GPP Security Interworking; Identity Management and Generic Authentication Architecture (GAA) Interworking", Release 9, Dec. 2009.

3GPP TS 24.109, "3rd Generation Partnership Project; Technical Specification Group Core Network and Terminals; Bootstrapping interface (Ub) and network application function interface (Ua); Protocol details", Release 8, v8.2.0, Jun. 2009.

3GPP TS 29.109, "3rd Generation Partnership Project; Technical Specification Group Core Network and Terminals; Generic Authentication (GAA); Zh and Zn Interfaces based on the Diameter protocol", Stage 3, Release 8, v8.3.0, Sep. 2009.

3GPP TS 33.220, "3rd Generation Partnership Project; Technical Specification Group Services and System Aspects; Generic Authentication Architecture (GAA); Generic bootstrapping architecture", Release 8, v8.7.0, Jun. 2009.

3GPP TS 33.222, 3rd Generation Partnership Project; Technical Specification Group Services and System Aspects; Generic Authentication Architecture (GAA); Access to network application functions using Hypertext Transfer Protocol over Transport Layer Security (HTTPS), Release 8, version 8.0.0, Jun. 2008.

3GTR 22.924, "3rd Generation Partnership Project; Technical Specification Group Services and System Aspects Service Aspects; Charging and Accounting Mechanisms", version 3.1.1., Apr. 1999.

Falstrom, "The E.164 to Uniform Resource Identifiers (URI) Dynamic Delegation Discovery System (DDDS) Application (ENUM)", RFC 3761, Apr. 2004.

Open ID Foundation, "OpenID Attribute Exchange 1.0", Dec. 5, 2007, downloaded from the Internet: <http://openid.net/, on Aug. 26, 2014.

Open ID Foundation, "OpenID Provider Authentication Policy Extension 1.0", Dec. 30, 2008, downloaded from the Internet: <http://openid.net/, on Aug. 26, 2014.

OpenID Foundation, "OpenID Authentication 2.0", Dec. 5, 2007, downloaded from the Internet: <http://openid.net/> on Aug. 26, 2014.

\* cited by examiner

USER IDENTITY MANAGEMENT FOR PERMITTING INTERWORKING OF A BOOTSTRAPPING ARCHITECTURE AND A SHARED IDENTITY SERVICE

RELATED APPLICATION

This application was originally filed as Patent Cooperation Treaty Application No. PCT/IB2010/054736, filed Oct. 19, 2010, which claims priority benefit to U.S. Provisional Patent Application No. 61/252,918 filed Oct. 19, 2009

TECHNOLOGICAL FIELD

Embodiments of the present invention relate generally to wireless technology and, more particularly, relate to systems, methods, apparatuses, and computer program products for facilitating interworking within mobile authentication architectures.

BACKGROUND

Security of mobile terminals, such as portable communication devices (PCDs) (e.g., cellular telephones), portable digital assistants (PDAs), laptop computers, or any suitable device that is capable of communicating with a wireless network, is increasingly important to mobile terminal users. Security algorithms are often employed to achieve security between a mobile terminal and another network entity. These security algorithms often rely upon a secret that is shared between the mobile terminal and the other network entity that permits the mobile terminal to be authenticated. Typically, this shared secret is embodied in the form of a cryptographic key or username/password combination.

A Generic Bootstrapping Architecture (GBA) is a framework architecture that allows bootstrapping of a security key between a mobile terminal and the home network, which can then be used to further derive security keys for use between the mobile terminal and a network application server. The network application server or the network node using the shared secret with the mobile terminal can reside in any kind of network, e.g., visited network, open Internet, or it can even be another device. Recently, GBA has been thought of for use in combination with identity management systems such as, for example, the Liberty Alliance. Accordingly, Third Generation Partnership Project (3GPP) Generic Authentication Architecture (GAA), which may, for example, be based on mobile algorithms AKA (authentication and key agreement) for 3GPP or CHAP (challenge-handshake authentication protocol) and CAVE (cellular authentication and voice encryption) for 3GPP 2, may be employed to provide single sign on access to multiple services or websites after an initial sign on and authentication of the user. With the deployment of GBA, other protocols may also be used for bootstrapping such as, for example, protocols developed by CableLabs or the Open Mobile Alliance. The main difference between those variants lies in the actual method used to generate the shared secret. The deployment, usage and handling of the service specific shared secrets remain the same for all the above mentioned variants of GBA. This allows network operators with heterogeneous network infrastructures, e.g., if a network operator owns a fixed and a mobile network, to allow users to use the same service independent of how they want to access the service (e.g., via PC, phone etc). Additionally, for the operator, backend servers can be re-used to a large extent.

When accessing protected resources such as services or websites over a network, particularly for the first time, it is often necessary to fill out an often extensive form that includes a multitude of routine personal information. A username and password are often entered to be associated with the personal information in an "account" such that future request for services or visits to a particular website only require a user to enter their username and password to authenticate a user. A single user may have a plethora of accounts with different services and/or websites and each time a change is made to their personal information, each account would have to be updated separately. Further, different services may have different requirements for usernames and passwords and may result in different usernames and passwords for each service or website. Accordingly, certain mechanisms have been developed to mediate access to protected resources or provide an open authentication mechanism. OpenID is a shared identity service that allows Internet users to log on to different web sites using a single digital identity. Thus, users may not need a different user name and password for each site and all personal information can be updated in one location. OpenID is a decentralized, free and open standard that lets users control the amount of personal information they provide. OpenID is an example of a protocol that has been developed for use in connection with open authentication. This protocol is based on the redirection feature of current web browsers, but does not address authorization. It should be noted, that the service channel might be different from the connection used to authenticate.

SUMMARY

A method, apparatus and computer program product are therefore provided according to one embodiment to facilitate authentication of a request, such as by a mobile terminal, while also supplying information about the user to a service, website, application or the like. A method, apparatus and computer program code of one embodiment provide for interworking a bootstrapping architecture, such as Generic Bootstrapping Architecture, and a shared identity service, such as OpenID architecture. In this regard, for example, some embodiments of the present invention may provide for a secure session with a service provider through GBA while being able to supply the service provider with the user information and/or accessing a user account using OpenID architecture. The interworking of a bootstrapping architecture, e.g., GBA, and a shared identity service, e.g., OpenID architecture, may provide an enhanced user experience by increasing the efficiency and ease with which a user can securely access services.

In particular, the method of example embodiments includes causing a request to be provided to a service provider, receiving redirection to a shared identity service, causing an authentication request to be provided to the shared identity service, receiving a shared identity service authentication, establishing a user session security key, and establishing a session with a service provider using the session security key and the shared identity service authentication. Establishing the user session security key may be performed using generic bootstrapping architecture (GBA). The request to the service provider may include a user identifier and the user identifier may be a pseudonym. The user session security key may be a bootstrapping transaction identifier (B-TID). The service provider may establish a shared secret with the shared identity service in response to receiving the request. Establishing a session with the service provider may include supplying the user security key to a network application function (NAF), receiving authentication information from the network application function in response to supplying the user security key, and providing an authentication assertion to the service provider.

According to another embodiment of the present invention, an apparatus is provided. The apparatus may include at least one processor and at least one memory including computer program code. The at least one memory and the computer program code may be configured to, with the at least one processor, cause the apparatus to cause a request to be provided to a service provider, receive re-direction to a shared identity service, cause an authentication request to be provided to the shared identity service, receive a shared identity service authentication, establish a user session security key, and establish a session with a service provider using the session security key and the shared identity service authentication. Establishing the user session security key may be performed using generic bootstrapping architecture. The request to the service provider may include a user identifier and the user identifier may be a pseudonym. The user session security key may be a bootstrapping transaction identifier. The service provider may establish a shared secret with the shared identity service in response to receiving the request. Establishing a session with the service provider may include supplying the user security key to a network application function, receiving authentication information from the network application function in response to supplying the user security key, and providing an authentication assertion to the service provider.

A further embodiment of the present invention may include a computer program product including at least one computer-readable storage medium having computer-executable program code instructions stored therein. The computer executable program code instructions may include program code instructions for causing a request to be provided to a service provider, program code instructions for receiving re-direction to a shared identity service, program code instructions for causing an authentication request to be provided to the shared identity service, program code instructions for receiving a shared identity service authentication, program code instructions for establishing a user session security key, and program code instructions for establishing a session with a service provider using the session security key and the shared identity service authentication. The program code instructions for establishing a user session security key may be performed using generic bootstrapping architecture. The request to the service provider may include a user identifier and the user identifier may be a pseudonym. The user session security key may be a bootstrapping transaction identifier. The service provider may establish a shared secret with the shared identity service in response to receiving the request. The program code instructions for establishing a session with the service provider may include program code instructions for supplying the user security key to a network application function, program code instructions for receiving authentication information from the network application function in response to supplying the user security key, and program code instructions for providing an authentication assertion to the service provider.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 8:
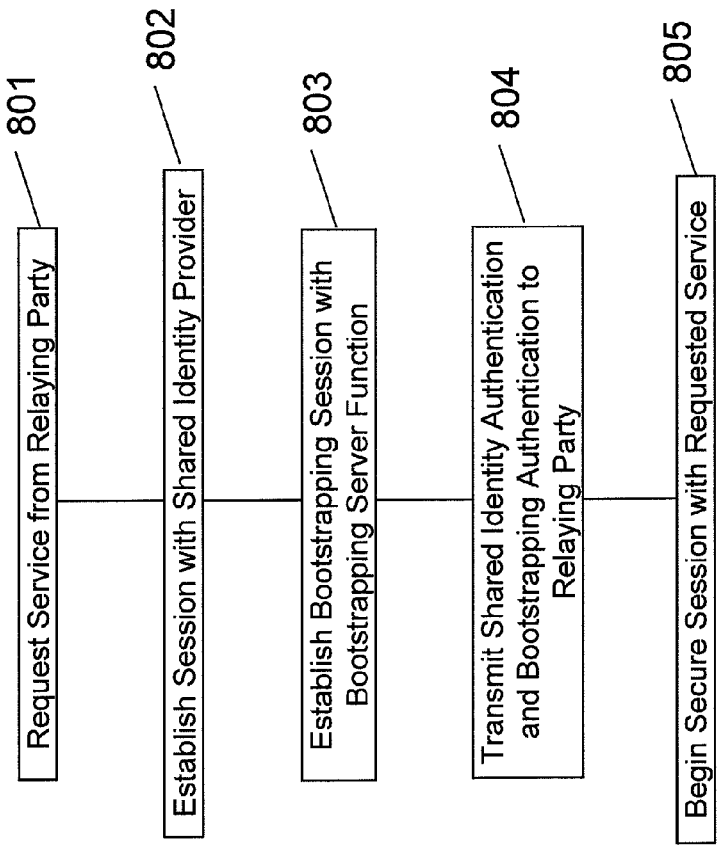
Figure 9:
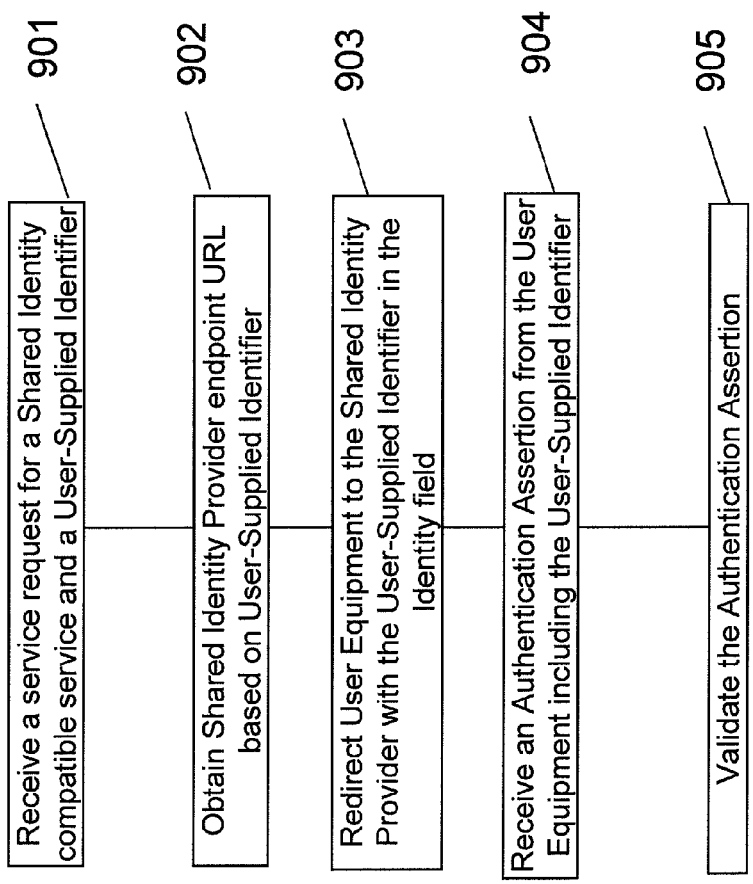

FIG. 8 is a flow chart according to another example method for interworking between a shared identity architecture and a bootstrapping architecture according to one example embodiment of the present invention; and FIG. 9 is a flow chart according to another example method for interworking between a shared identity architecture and a bootstrapping architecture according to another example embodiment of the present invention.

DETAILED DESCRIPTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device or tamper resistant module in the device), can be differentiated from a "computer-readable transmission medium," which refers to an electromagnetic signal.

A method, apparatus and computer program code are therefore provided for interworking a bootstrapping architecture and a shared identity service. Although described hereinafter in the context of the interworking of Generic Bootstrapping Architecture and OpenID architecture, Generic Bootstrapping Architecture and OpenID architecture are provided by way of example, but not of limitation. Accordingly, a user may use a single log-in to establish a secure connection and access a service from a user equipment device. In accordance with various embodiments of the present invention, a session may be initiated by a user browsing to a service or website that is enabled with a shared identity service, such as OpenID functionality. In this embodiment, a user may supply an OpenID identifier to a Relaying Party (RP) which is usually the service providing network node. The RP may then normalize the User-Supplied Identifier, retrieve the address of the OpenID provider, and perform a discovery of the OpenID provider Endpoint uniform resource locator (URL) that the user wishes to use for authentication based on the User-Supplied Identifier. The RP may then establish a secure shared secret with a Network Application Function (NAF) that may be co-located with an OpenID provider. The RP may then redirect the User Equipment (UE) browser to the OpenID provider with an OpenID authentication request. The UE may send an HTTP GET request to the OpenID provider and receive an authentication request in return. The UE may then employ a bootstrapping architecture, such as GBA, to bootstrap with a Bootstrap Server Function (BSF) to get a Bootstrapping Transaction Identifier (B-TID) which identifies the generated security key(s) and can be used to identify an authenticated GBA user. Further optional identities possible in a bootstrapping architecture, such as GBA, include IMPI (IMS Private identity), IMPU (IMS Public Identity), IMSI (International Mobile Subscriber Identity), or other identifiers that are stored in the User Security Settings (USS). The UE may then supply the B-TID to the NAF, that in turn verifies the B-TID from the BSF and receives the authorization information and policies for information release to the RP. The NAF may then redirect the UE browser to the RP with an authentication assertion that the RP may then validate. Once validated, the user may use the desired service.

The single identity employed by a shared identity service, such as an OpenID identifier, may be in the form of a pseudonym that provides information about the operator's domain to ensure that the OpenID discovery procedure can be used successfully. This identifier may not provide information about the specific user itself, for example by providing a specially constructed string that denotes anonymous user. A series of pseudonyms for a user may be created by the GBA mechanism some time ahead. The pseudonyms could be computed without prior involvement of the operator, such as when a specific range of values is assigned to the user.

The single identity employed by a shared identity service, such as an OpenID identifier, may be determined based on an identifier associated with the user and/or the UE, such as the MSISDN (Mobile Subscriber International Subscriber Directory Number) of the user. The mapping of an mobile network specific identifier, such as an MSISDN, to an OpenID identifier may occur at the end host as part of a web browser plug-in or as code that serves as an extension to the GBA code. In such an embodiment, the browser may provide the discovered OpenID identifier along with the HTTP page when accessing the RP webpage for use with the OpenID. Optionally, the RP itself may perform the MSISDN to OpenID identifier lookup. In such an embodiment, the user may enter the MSISDN into the OpenID logon window or it may be entered automatically as in an auto-fill mechanism. The identifier associated with the user and/or the UE, e.g., a MSISDN identifier, may be translated to the OpenID identifier by the ENUM (Telephone Number Mapping) procedure that converts a MSISDN into a string such that it can be used for a DNS lookup and to identify available services. ENUM assigns a sequence of traditional telephone numbers to Internet domain names without any possibility for ambiguity.

Figure 1:
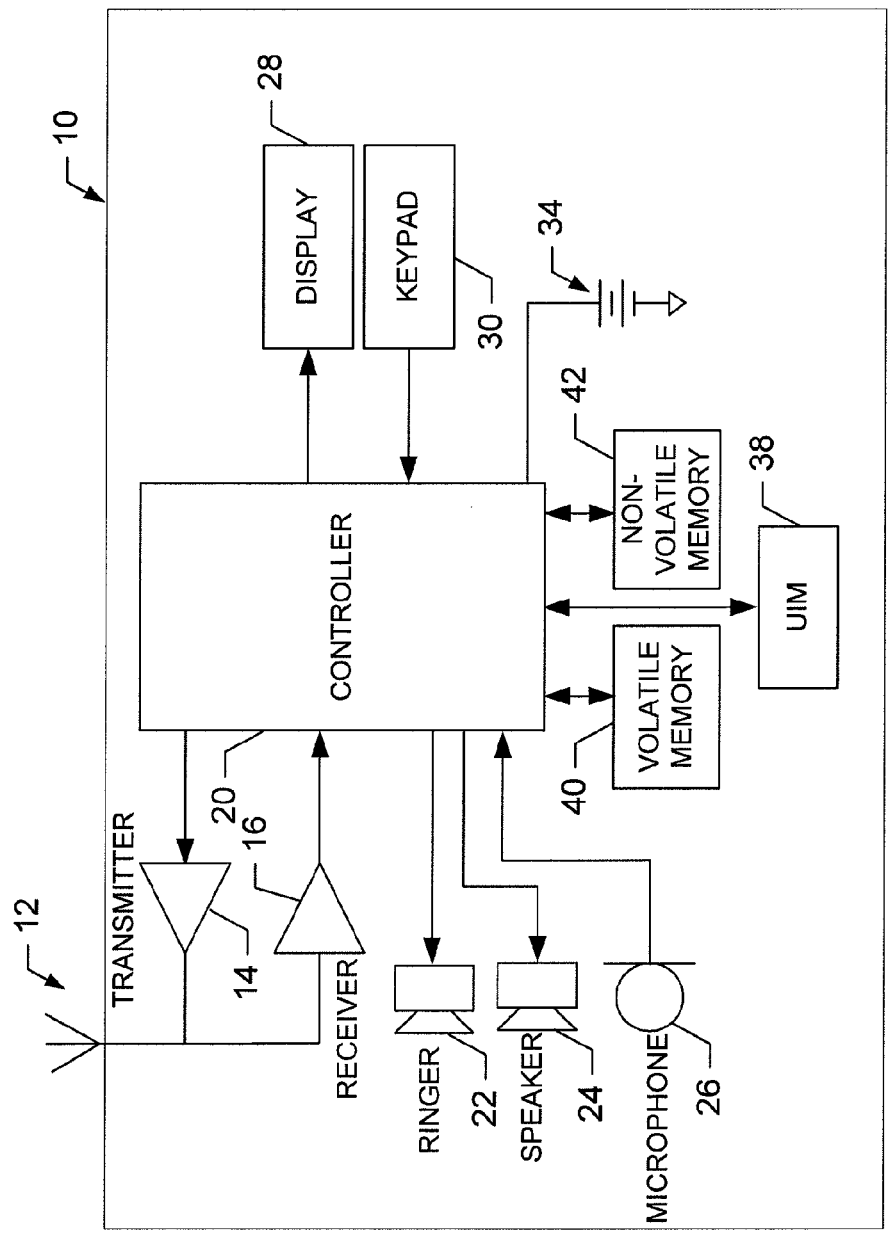
FIG. 1 is a schematic block diagram of a mobile terminal according to an example embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS (Global Positioning Satellite) devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 may include an antenna 12 (or multiple antennae) in operable communication with a transmitter 14 and a receiver 16. The mobile terminal 10 may further include an apparatus, such as a controller 20 or other processing element that provides signals to and receives signals from the transmitter 14 and receiver 16, respectively. The signals may include signaling information in accordance with the air interface standard of the applicable cellular system, and also user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks. Embodiments of the invention could also be utilized by a PC, that has an operator smart card (e.g. user identity module (UIM), or subscriber identity module (SIM), or universal subscriber identity module (USIM)) attached or other secure hardware module allowing enabling the security for network access, then no antenna would be needed, but another communication apparatus is assumed to be present (e.g. fixed line).

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interweave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example. Additionally, the connectivity program may allow unidirectional information to be processed e.g. broadcast reception for Mobile TV.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface e.g. via cable to PC. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), trusted hardware module, a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. The UIM may be realized in hardware, software and/or some combination thereof. The user identity may also be compromised of another identifier, e.g., line identifier, in addition to or instead of the IMEI.

Figure 2:
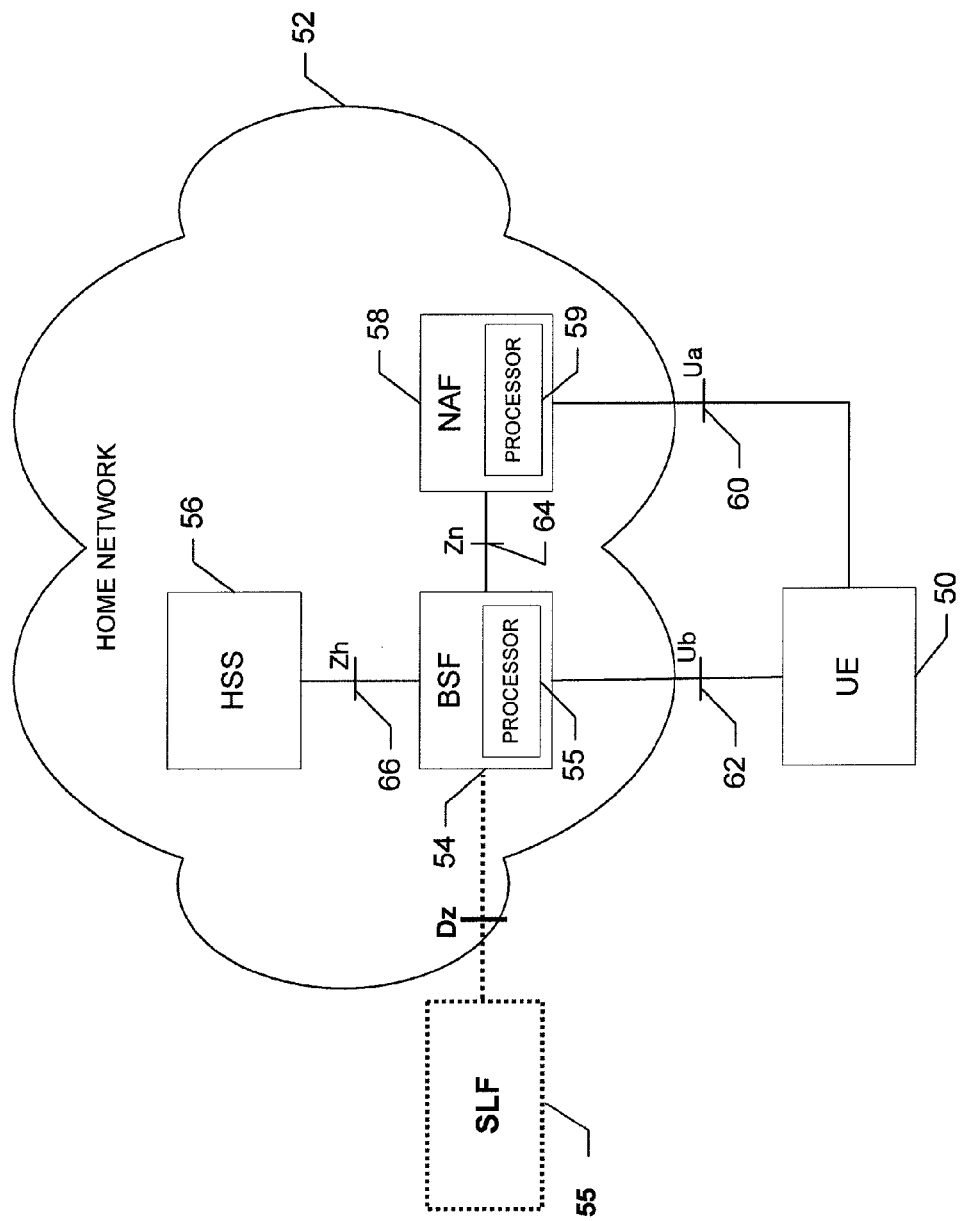
FIG. 2 is a schematic block diagram of a network model according to an example embodiment of the present invention.

FIG. 2 illustrates a block diagram of a simple network model that may benefit from embodiments of the present invention. As shown, a user equipment (UE) 50 (an example of which may include the mobile terminal 10 of FIG. 1) is shown to be in communication with a home network 52, such as a cellular network. While a mobile telephone is a common example of a mobile terminal, a mobile telephone is merely illustrative of one type of mobile terminal that may benefit from embodiments of the present invention and, therefore, should not be taken to limit the scope of the present invention. Moreover, although embodiments of the present invention will be primarily described in conjunction with mobile communications applications, other embodiments of the present invention can be utilized in conjunction with a variety of other applications like web site access, television (TV), news services, auction services, both in the mobile communications industries and outside of the mobile communications industries.

Although not shown in FIG. 2, in the embodiment in which the home network 52 is a cellular network, the UE 50 generally includes an antenna for transmitting signals to and for receiving signals from one or more base transceiver stations (BTS's) (also termed base stations or eNodeB for newer networks, Home (e) NB or a WLAN access point). The BTS is a part of one or more cellular or mobile networks that each includes elements required to operate the network. A BTS may act as the interface between a network and a mobile node, in that the BTS converts digital data into radio signals and converts radio signals into digital data. Each BTS generally has an associated radio tower or antenna and communicates with various access terminals using radio links. In particular, BTSs may communicate with various access terminals through the modulation and transmission of sets of forward signals, while BTSs may receive and demodulate sets of reverse signals from various access terminals that are engaged in a wireless network activity (e.g., a telephone call, Web browsing session, etc.).

BTSs may generally connect to one or more base station controllers (BSCs). The connection between a BTS and a BSC may use, for example, un-channelized T1 facilities or direct cables. BSCs may be used to interface (aggregate) all radio frequency (RF) traffic arriving from the antennas of the BTSs, and to provide this traffic to a mobile switching center (MSC). BSCs are generally responsible for managing the radio resources for one or more BTSs. For example, BSCs may handle radio-channel setup, frequency hopping, and handovers. Moreover, the MSC is responsible for providing the interface between the radio access network (RAN), which includes BTSs, BSCs, and packet control functions (PCFs), and a public switched telephone network (PSTN). In particular, an MSC may control the signaling required to establish calls, and allocate RF resources to BSCs and PCFs. In operation, the MSC is capable of routing calls, data or the like to and from mobile stations when those mobile stations are making and receiving calls, data or the like. The MSC can also provide a connection to landline trunks when mobile stations are involved in a call.

PCFs may be used to route internet protocol (IP) packet data between mobile terminals (when within range of one of the BTSs) and a packet data service node (PDSN). A PDSN, in turn, may be used to provide access to one or more IP networks, such as, for example, the Internet, intranets, applications servers, or corporate virtual private networks (VPNs). In this manner, a PDSN acts as an access gateway. The network may or may not utilize Network Address Translation.

Although not every element of every possible network is shown and described herein, it should be appreciated that the UE 50 may be coupled to one or more of any of a number of different networks using one or more of any of a number of different modes (also referred to herein as protocols). In this regard, the network can be capable of supporting communication in accordance with any one or more of a number of first-generation (1G), second-generation (2G), 2.5G, third-generation (3G), 3.9G, fourth-generation (4G) mobile communication protocols or interworking of those with other radio technologies or the like. More particularly, the mobile terminal may be coupled to a network capable of supporting communication in accordance with 2G wireless communication protocols IS-136 (TDMA), GSM, and IS-95 (CDMA). Also, for example, the network can be capable of supporting communication in accordance with 2.5G wireless communication protocols general packet radio service (GPRS), Enhanced Data GSM Environment (EDGE), or the like. In addition, for example, one or more of the network(s) can be capable of supporting communication in accordance with 3G wireless communication protocols such as CDMA2000 and a Universal Mobile Telephone System (UMTS) network employing Wideband Code Division Multiple Access (WCDMA) radio access technology. Additionally, the network may be capable of supporting wide area network (WAN) communications, such as WLAN (IEEE 702.11) or Worldwide Interoperability for Microwave Access (WiMAX) (702.16) or fixed line access. Some narrow-band advanced mobile phone service (NAMPS), as well as total access communications system (TACS), network(s) may also benefit from embodiments of the invention, as should dual or higher mode mobile stations (e.g., digital/analog or TDMA/CDMA/analog phones).

Reference is again made to FIG. 2, which illustrates a network model according to, for example, a basic GBA framework in which the home network 52 includes a bootstrap server function (BSF) 54, a home subscriber system (HSS) 56, and a network application function (NAF) 58. While the network model of FIG. 2 is described below, this network model is provided by way of example and not of limitation since other network models may similarly support embodiments of the present invention. With respect to FIG. 2, however, it is noted that other NAFs may exist either in the home network or in foreign networks. Although not shown, the home network 52 may further include a home location register (HLR) or an authentication, authorization and accounting (AAA) server. AAA, HLR and HSS may include databases which contain cryptographic information for access authorization and user identity information. Accordingly, wherever the term HSS is used hereinafter, the term should be seen as an example of a database containing cryptographic information for access authorization and user identity information and is replaceable by HLR, AAA or the like. The BSF 54 may be a server or other computing device located in the home network 52 of a mobile terminal (e.g., the UE 50), as indicated in FIG. 2, which is configured to allow the bootstrapping of a shared key, Ks, between the UE 50 and the BSF 54. The NAF 58 may be an application specific server or other computing device within the home network 52 (or other networks) which, using a derived application key, called Ks_(ext/int)_NAF, may be used between the UE 50 and the application server called NAF 58. Ks_(ext/int)_NAF is application server specific in that each application server will have a different application key Ks_(ext/int)_NAF derived from the master key Ks, thus ensuring that different application servers do not share the same application key. The notation Ks_(ext/int)_NAF means that if the terminal variant of GBA is used then one key Ks_NAF is derived, if the smart card specific variant of GBA is used (called GBA_U), then two keys Ks_int_NAF and Ks_ext_NAF are derived in the smart card and only Ks_ext_NAF leaves the smart card. Of note, although the terms BSF and NAF used herein are typically associated with a GBA framework, such terms should be construed to be applicable to devices having corresponding functions that may be outside the GBA framework as well. The BSF may serve a large range of network types and not be necessarily bound to one network type. The BSF may also be integrated part of a subscriber database, like HSS.

In an exemplary embodiment, the HSS 56 may include a complete set of a user's GBA user security settings (GUSS). The GUSS may also be stored externally next to the BSF. The HLR may include subscriber information used in handing over calls to networks other than the home network 52 and the AAA server may dictate the computer resources that users have access to and keep track of user activity over a network. It should be noted, however, that alternative exemplary embodiments of a network model may not include one or more of the above described components and/or may include additional components. In the third generation partnership project 2 (3GPP2), for example, GBA bootstrapping may be based on a long term shared secret stored in the HSS 56 (in which case, AKA (Authentication and Key Agreement) may be used), or the HLR (in which case cellular authentication and voice encryption (CAVE) may be used), or the AAA server (in which case Mobile IP authentication may be used). In 3GPP, GBA bootstrapping is based on a long term shared secret stored in the HSS 56 (and AKA is used).

In an exemplary embodiment, the NAF 58 and the BSF 54 may each include corresponding processors 59 and 55, respectively. The processors 59 and 55 may be local and associated with the NAF 58 and the BSF 54, respectively, and may be configured to, for example, execute instructions stored in a memory located at or accessible to the respective processors 59 and 55 for the performance of corresponding functions as defined herein. A processor such as those described herein may be embodied in many ways. For example, the processor may be embodied as a processor, a coprocessor, a controller or various other processing means or circuitry including integrated circuits such as, for example, an ASIC (application specific integrated circuit). As such, although each of the NAF 58 and the BSF 54 may be any means or device embodied in hardware, a computer program product or a combination of hardware and software that is configured to perform the respective functions of the NAF 58 and the BSF 54, the processors 59 and 55 may alternatively control or otherwise be embodied as the NAF 58 and the BSF 55, respectively.

In the example network model of FIG. 2, communication between various elements may be established via interfaces. For example, the UE 50 may communicate with the NAF 58 via a first interface (Ua) 60 (e.g., via IP, HTTP protocol). The UE 50 may communicate with the BSF 54 via a second interface (Ub) 62 (e.g., running AKA for authentication). The BSF 54 may communicate with the NAF 58 via a third interface (Zn) 64 (e.g., via DIAMETER or web service protocol). The BSF 54 may communicate with the HSS 56 (and/or the HLR and AAA server, if applicable) via a fourth interface (Zh) 66 (e.g., via the DIAMETER, Remote Authentication Dial-in User Service (RADIUS) or Message Application Protocol (MAP) protocol). Note, that there may be some proxies in those interfaces e.g. diameter D-Proxy. Thus, for example, in order to commence a bootstrap procedure, the UE 50 may submit a bootstrap request to the BSF 54 via the Ub interface 62. Upon receipt of the bootstrap request, the BSF 54 and the UE 50 continue with the bootstrapping procedure over the Ub interface 62, which comprises a message exchange which may involve two or more roundtrips between the UE 50 and the BSF 54, and may involve mutual authentication between the UE 50 and the home network 52. The bootstrapping procedure of this embodiment results in the shared secret Ks (with an associated B-TID and a lifetime) at both the UE 50 and BSF 54. Subsequently, when the UE 50 attempts to communicate with the NAF 58 via the Ua interface 60, the UE 50 can derive the specific Ks_(ext/int)_NAF (e.g., one or several application specific key(s)) from the Ks (using a predefined Key Derivation function (KDF), based on information including an identity of the NAF 58). In this embodiment, the UE 50 conveys the B-TID to the NAF 58, which will then contact the BSF 54 via the Zn interface 64. The BSF 54 may then contact the HSS to obtain, over the Zh or Zh' interface, the needed data to derive the Ks and optionally also further security related information e.g., GBA User Security Settings (GUSS). Then the BSF of this embodiment derives the Ks_ext/int)_NAF the same way as the UE 50, and returns the Ks_ext/int)_NAF back to the NAF 58 (the key lifetime and the User Security Settings (USS) which may be part of the GUSS may also be provided along with the key(s)). Subsequent communications conducted by the application executed by the UE 50 and the NAF 58 can then be secured via the new Ks_(ext/int)_NAF or further keys derived from those.

Currently, communication via the Zn interface 64 may be limited to exchanging information for acquiring keys, USS and corresponding key lifetimes. It should be noted that the Zn interface may utilize a Zn-proxy in some cases and then is called Zn' interface.

According to one example aspect of embodiments of the invention, the functions performed by one or more of the entities of the system, such as the BSF 54, the NAF 58, the UE 50 or any of the other elements, may be performed by various means, such as hardware and/or firmware, including those described above, alone and/or under control of a computer program product. The computer program product for performing one or more functions of exemplary embodiments of the invention may include a computer-readable storage medium, such as the non-volatile storage medium, and software including computer-readable program code portions, such as a series of computer instructions, embodied in the computer-readable storage medium.

Another example embodiment of message flow according to a bootstrapping architecture and, as a more particular example, a GBA architecture is described herein with reference again to FIG. 2. The UE may send a bootstrapping HTTP request to the BSF over the Ub 62 reference point, where Ua 60 and Ub 62 are interfaces to the UE 50. The BSF 54 may then determine the IMPI or other identifier based on the request. If there are several HSSs 56, the BSF 54 may consult the LF 55 to determine the name of the correct HSS 56 for the user of the UE 50. The BSF 54 may then retrieve the complete set of GUSS settings and one Authentication Vector (AV) over the reference point Zh 66 from the HSS 56, where Zh is the reference point between the BSF 54 and the HSS and it allows the BSF to fetch the required authentication credentials. The BSF might use a local copy of the GUSS. If GVA with User Identity Module-based enhancements (GBA_U) is intended to be used by the NAF 58, then the GUSS may be used. If no HSS with Zh reference point is deployed, the BSF of this embodiment retrieves the Authentication Vector over the reference point Zh' from either an HLR or an HSS with Zh' reference point support. Next, the BSF may forward the authentication data parameter (RAND) and the authentication token (AUTN) to the UE in the "401" error message. This error message is to demand the UE to authenticate itself. The UE may then check the AUTN to verify that the challenge is from an authorized network. The UE may also calculate CK, IK, and RES which will result in session keys IK and CK in the UE. The UE may then send another HTTP request containing the Digest AKA response (calculated using RES) to the BSF. The BSF may then authenticate the UE by verifying the Digest AKA response. The BSF may then generate a master key material Ks by concatenating CK and IK. The BSF may generate the application specific keys Ks_(ext/int)_NAF. The B-TID value may also be generated by the BSF. The BSF may send a 200 OK message, including a B-TID, to the UE to indicate the success of the authentication. Additionally, in the 200 OK message, the BSF may supply the lifetime of the key Ks. The key material Ks is generated in the UE. Both the UE and the BSF may use the Ks to derive the application specific key material Ks_NAF to be used for securing the reference point Ua, If GBA_U is used, then the Ks_ext_NAF may be used for securing the Ua reference point. The UE and the BSF may store the key Ks with the associated B-TID for further use until the lifetime of Ks has expired, or until the key Ks is updated, or until the deletion conditions are satisfied.

A bootstrapping architecture, such as GBA, may be used in many services such as Multimedia Broadcast Multicast Services (MBMS), Enhanced MBMS, Access Network Discovery and Service Function (ANDSF), Open Mobile Alliance (OMA) XML Document Management, Presence Security, etc. GBA can use Universal Subscriber Identity Module (USIM) with GBA_U aware Universal Integrated Circuit Card (UICC) application, IP Multimedia Services Identity Module (ISIM), or SIM cards.

Figure 3:
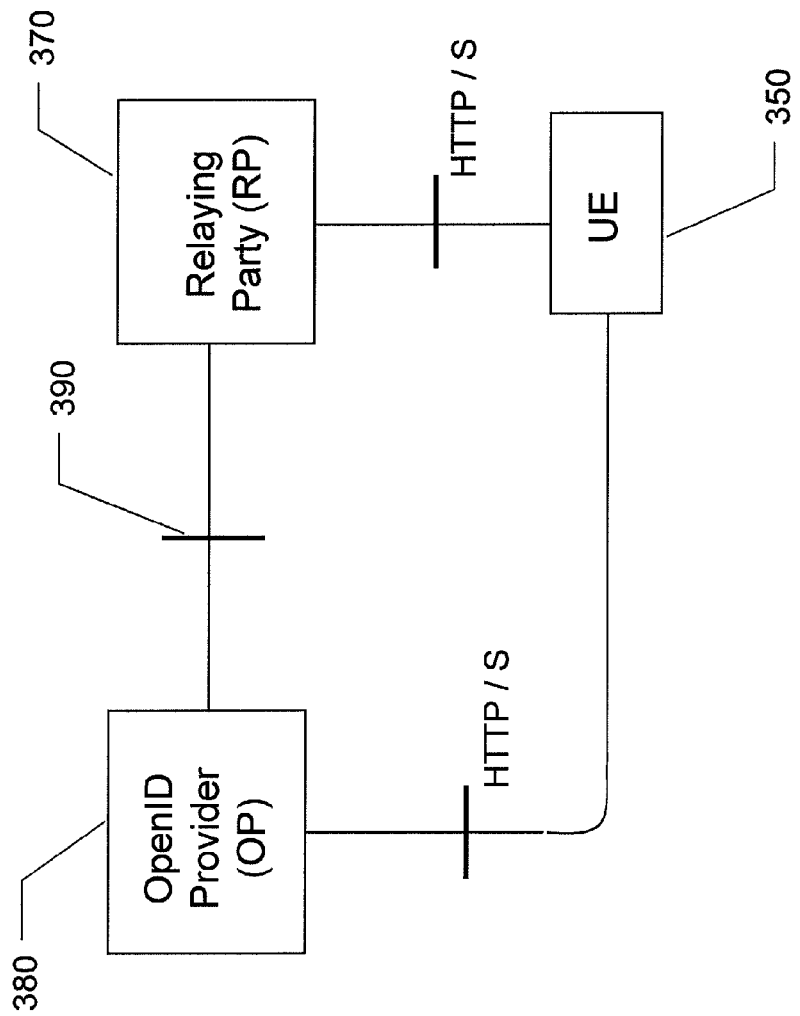
FIG. 3 is a schematic block diagram of a shared identity architecture, such as an OpenID architecture, according to an example embodiment of the present invention.

As an example of a shared identity service, the OpenID protocol is specified by the OpenID Foundation and uses a Uniform Resource Locator (URL) based identifier. OpenID is HTTP POST and REPLY based. An example embodiment of message flow of OpenID is described herein with reference to FIG. 3. The browser in the UE 350 may send a User-Supplied Identifier to the RP 370 which, in turn, may normalize the User-Supplied Identifier. The RP 370 may then retrieve the address of the OpenID Provider (OP) 380 and perform a discovery of the OP Endpoint URL (based on the User-Supplied Identifier) that the end user wishes to use for authentication. The RP 370 and the OP 380 may then establish a shared secret (called association) using the Diffie-Hellman Key Exchange Protocol at 390. The purpose of the shared secret is that the OP 380 may sign subsequent messages and the RP 370 can more easily verify those messages. The association is optional and not required for interworking purposes. The RP 370 may then redirect the UE's 350 browser to the OP 380 with an OpenID Authentication Request. The OP 380 establishes whether the end user is authorized to perform OpenID Authentication and wishes to do so. The OP 380 may redirect the UE's 350 browser back to the RP 370 with either an assertion that authentication is approved or a message that authentication failed. The RP 370 may then verify the information received from the OP 380 such that the user becomes authenticated.

It may be desirable to combine the functionality of bootstrapping architecture, such as GBA, with a shared identity service, such as an OpenID architecture, to ensure a secure session with a service provider through the bootstrapping architecture, e.g., GBA, while being able to supply the service provider with user information and/or accessing a user account using a shared identity service, e.g., OpenID architecture. The interworking of the bootstrapping architecture and the shared identity service may thus provide an enhanced user experience by increasing the efficiency and ease with which a user can securely access services.

Figure 4:
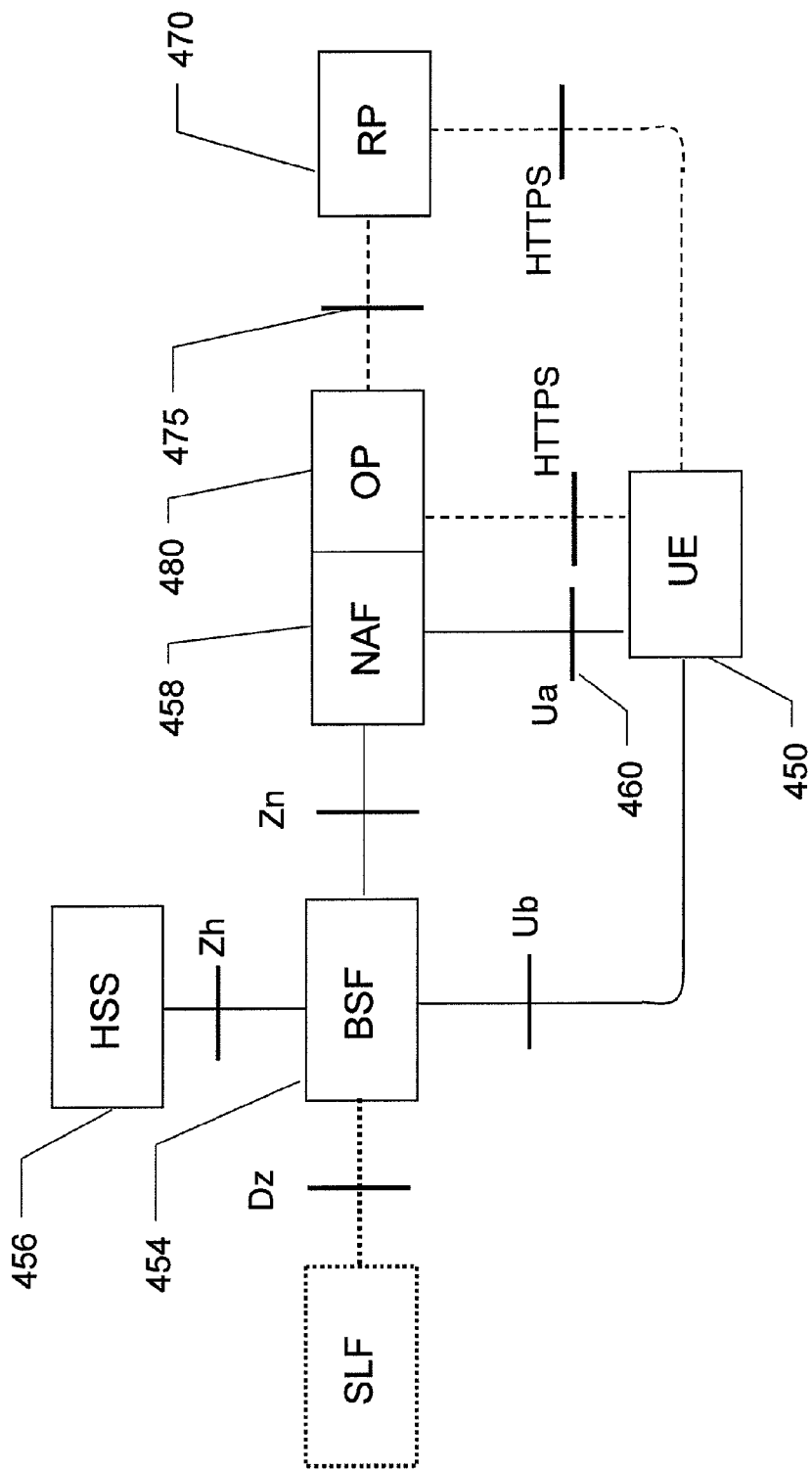
FIG. 4 is a schematic block diagram of a bootstrapping architecture and a shared identity architecture interworking according to an example embodiment of the present invention.

Having thus described the message flow according to a bootstrapping architecture, e.g., GBA, and a shared identity service, e.g., OpenID architecture, an example embodiment of interworking of a bootstrapping architecture and a shared identity service as represented by way of example by GBA and OpenID architectures, respectively, is herein described with reference to FIG. 4. In the illustrated embodiment, the NAF 458 functionality is co-located with the OP 480. The NAF 458 functionality may be added in the form of a library to the OpenID server. The dashed lines of FIG. 4 represent interfaces that originate from the OpenID architecture while the solid lines represent interfaces that originate from the GBA architecture. The UE 450 uses the browser to communicate with the OP 480. The Ua 460 protocol may be based on 3GPP standards TS 24.109 and TS 33.222 and be supported by OP/NAF and the UE 450. The OP/NAF and UE may support variants of the Ua 460 protocol. The OP 480 and RP 470 may communicate using the HTTP-based Diffie-Hellmann protocol at 475. While FIG. 4 illustrates two interfaces between the NAF/OP and the UE, there may only be one since the Ua 460 is the application protocol, which in this case may be the OpenID Hypertext Transfer Protocol Secure (HTTPS).

Figure 5:
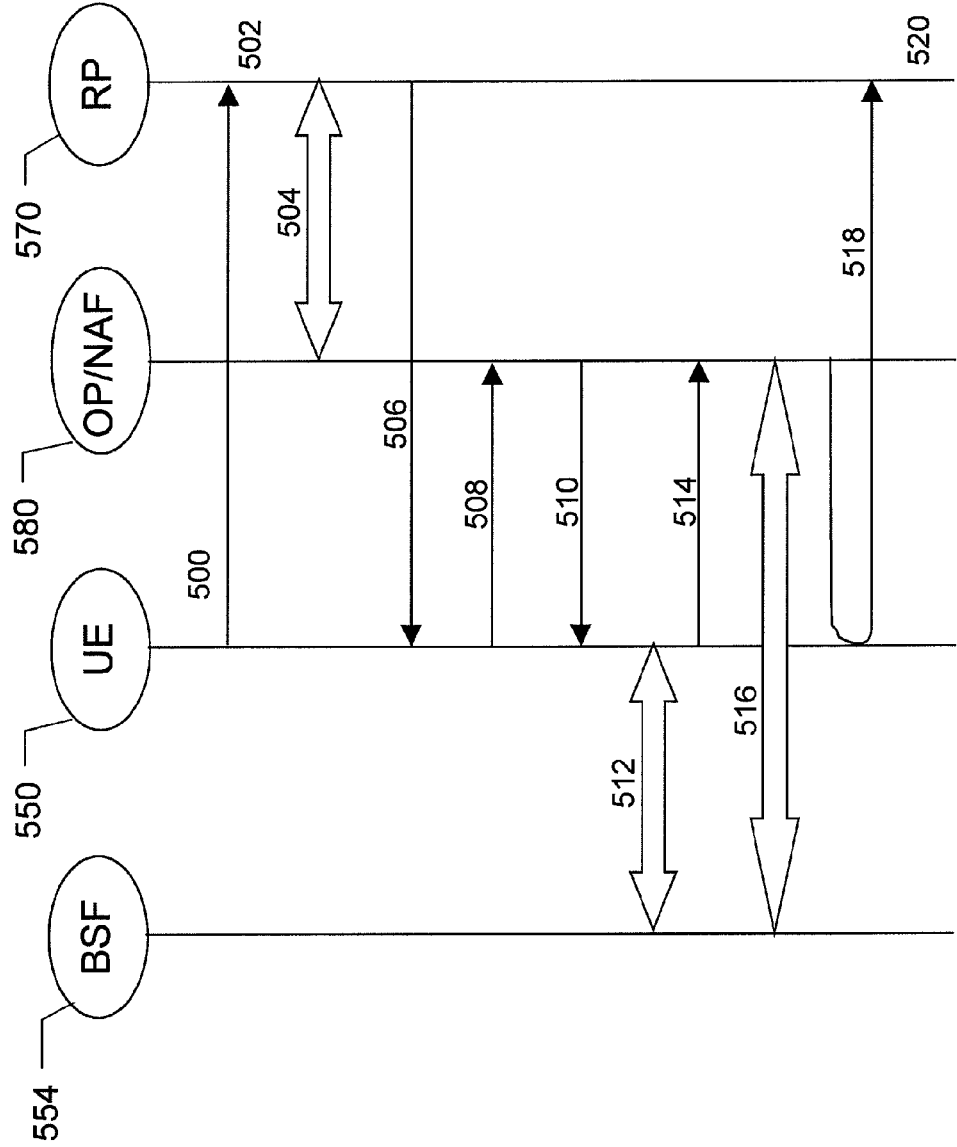
FIG. 5 is a flow diagram of the message flow of a bootstrapping architecture and a shared identity architecture interworking according to an example embodiment of the present invention.

FIG. 5 illustrates an example embodiment of the message flow of interworking of GBA and OpenID architecture of the system of FIG. 4. While reference is made to the elements of FIG. 5, the elements of FIG. 4 provide an example embodiment of a system supporting the message flow of FIG. 5. In the example embodiment described, the browser resides in the UE 550. A user may browse the internet from the UE 550 and encounter a webpage that supports OpenID. The user may wish to log into the webpage using OpenID to experience enhanced functionality, such as being able to comment on a blog. The user may click an OpenID log-in button and the browser of the UE may send a User-Supplied Identifier (e.g., OpenID identifier) to the RP 570 at operation 500. OpenID may use an identifier in the form of a URI (Uniform Resource Identifier) or an XRI (Extensible Resource Identifier) that is used between the OP and the RP, or in the format of a URL (Uniform Resource Locator). The browser of this embodiment thereby provides information about the operator's domain to ensure that the OpenID discovery procedure can be utilized successfully. Note that this identifier may be a pseudonym identifier and does not provide information about the specific user itself, for example, by providing a specially constructed string that denotes an anonymous user. A few variations are possible on when and where this pseudonym identifier is created. For example, the user could also use the GBA mechanism to create a series of pseudonyms some time ahead. Alternatively, a user could compute these pseudonyms without a prior involvement with the operator (when a specific range of values is assigned to the user).

Optionally, a service at the RP 570 may be configured to discover a unique number or other identifier associated with the user and/or the UE, such as the Mobile Subscriber International Subscriber Directory Number (MSISDN), a unique number defined by the E.164 nomenclature to identify a mobile device. This unique identifier, such as the MSISDN, may be used as an OpenID identifier or an OpenID identifier may be associated with the MSISDN that is discovered, such that the RP recognizes the MSISDN and determines the OpenID identifier. A browser plug-in may be implemented at the UE to allow the mapping of the MSISDN to an OpenID identifier. Further, the RP may allow an MSISDN to be entered in to an OpenID logon window such that the user can login to the RP using the MSISDN. The logon window of the RP may be able to auto-fill the logon window with the MSISDN from the UE once the UE navigates to the RP. The translation of an MSISDN to an OpenID identifier can be performed using the ENUM procedure outlined in IETF RFC 3761 (www.ietf.org/rfc/rfc3761.txt). In summary, the ENUM procedure converts an identifier, such as a telephone number (e.g., MSISDN), into a string corresponding to a Domain Name System (DNS) lookup in order to identify services available to the telephone number. A new service could be the OpenID identifier that could then be retrieved as a DNS resource record. Registration of the new service would be required in the ENUM procedure.

Hence, for interworking of GBA with OpenID, a user may use a Mobile Network Operator (MNO) specific identifier recognizable by the NAF. In one embodiment, when a user registers to an OpenID enabled service, the browser provides information about the operator domain to ensure that the OpenID discovery procedure can be used successfully. This can be done using MSISDN or pseudonyms (if supported). Once the User-Supplied Identifier is determined, such as based either on the pseudonym method or the unique identifier, e.g., MSISDN, method outlined above, the User-Supplied Identifier may be normalized and the RP 570 may retrieve the address of the OP 580 and perform a discovery of the OP Endpoint URL (based on the User-Supplied Identifier) that the end user wishes to use for authentication at operation 502.

The RP 570 and the OP 580 may then establish a shared secret (called association) using the Diffie-Hellman Key Exchange Protocol at operation 504. The purpose of this shared secret is that the OP can sign subsequent messages and the RP can easily verify those messages. The association is not required for interworking purposes. If the OP and RP do not both reside under the control of the same MNO, the use of association may be beneficial.

The RP 570 may then redirect the UE's browser to the OP 580 with an OpenID Authentication Request at operation 506. The RP may insert the user supplied identifier from operation 500 into the openid.claimed_id and into the openid.identity fields. The UE may then send an HTTP GET request to the OP at operation 508.

The NAF 580 may then initiate the UE 550 authentication and respond with an HTTPS response code 401 "Unauthorized", which contains a WWW Authenticate header carrying a challenge requesting the UE to use Digest Authentication with GBA as specified in 3GPP standard TS 33.222 with server side certificates at operation 510. If no Ks is available, then the UE may bootstrap with the BSF which results in the UE possessing a valid Ks at operation 512. From this operation, the UE 550 can derive the application specific (OpenID specific) Ks_ext/int)_NAF key(s).

The UE 550 may then generate an HTTP GET request to the NAF 580 at operation 514. The HTTP request may carry an authorization header containing the B-TID received from the BSF 554. If GBA push is used, the B-TID is not received from the BSF, but part of the GPI may contain the P-TID which is used instead of the B-TID. Using the B-TID and NAF_ID, the NAF 580 retrieves the shared application specific NAF key and optionally the USS (if GBA_U i.e. Ks_int/ext_NAF are used then the GUSS should be supported) from the BSF 554 over the web service based on the Zn reference point at operation 516. Optionally, the OP/NAF 580 can receive other identifiers from the BSF 554 such as an IMPI, MSISDN, and/or other identifiers stored in the USS. The NAF 580 may store the B-TID, the cryptographic keys and the user supplied identifier to allow matching of the OpenID user session and the GBA session. Since the OpenID is HTTP (S) based, the NAF/OpenID server may provide support for the interworking scenario with the Web Service based Zn reference point. The OpenID may support Diameter based implementation of the Zn reference point, though OPs are more likely to support HTTP(S) based reference points. The USS may contain authorization information, which the NAF may then retrieve. The OP may establish whether the end user is authorized to perform OpenID Authentication and wishes to do so based on the authorization information stored locally or in the USS. The USS could thereby act as a central authorization and privacy data store. In particular, the USS may contain information about the type of information that is allowed to be shared with the relaying party. This authorization information may be contributed by the user but also by the operator based on their business relationship with the relaying party and the conditions they have agreed on.

The NAF/OP 580 may then authenticate the user for OpenID. The NAF may redirect the browser to the return OpenID address, e.g., the OP redirects the UE's browser back to the RP 570 with either an assertion that authentication is approved or a message that authentication has failed at operation 518. The response header may contain a number of fields defining the authentication assertion. The NAF may respond with a 200 OK message. The RP 570 may then validate the assertion, such as by checking if the authentication was approved at operation 520. If a shared secret (association) was previously established, then it may now be used to verify the message from the OP: If the validation of the assertion and the verification of the message (if the shared secret was used) are successful, then the user may be logged in to the service of the RP.

Figure 7:
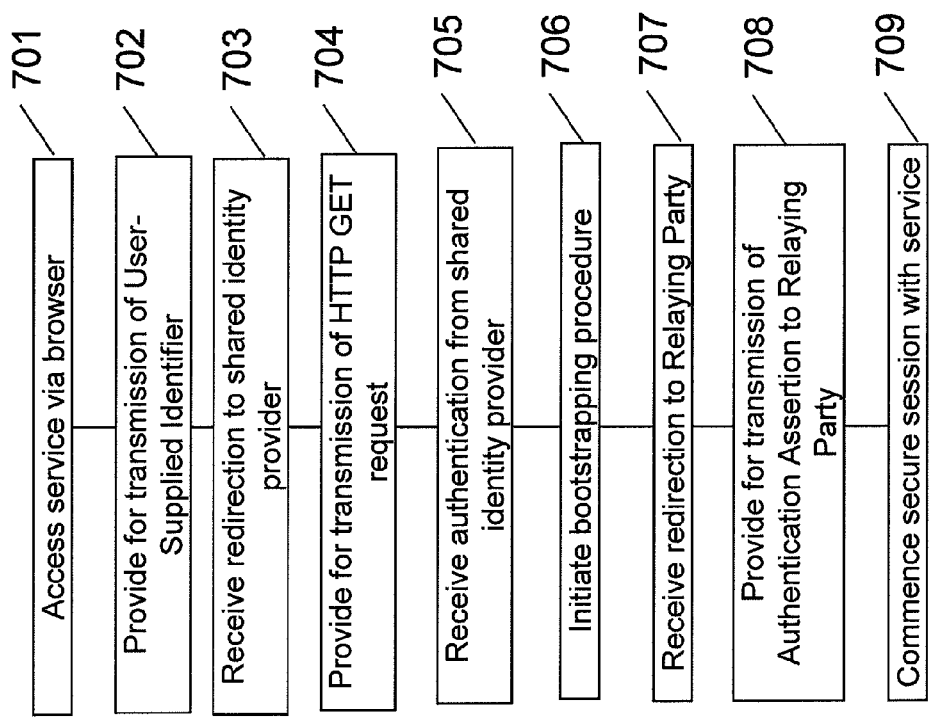
FIG. 7 is a flow chart according to another example method for interworking between a bootstrapping architecture and a shared identity architecture according to an example embodiment of the present invention.

In this regard, FIGS. 7 and 8 are each flowcharts of a method and program product according to example embodiment of the invention. It will be understood that each block of the flowcharts, and combinations of blocks in the flowcharts, can be implemented by various means, such as hardware, firmware, and/or computer program product including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s). These computer program instructions may also be stored in a computer-readable memory that can direct a computer or other programmable apparatus to function in a particular manner, such that the instructions stored in the computer-readable memory produce an article of manufacture which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions or combinations of special purpose hardware and computer instructions.

Figure 6:
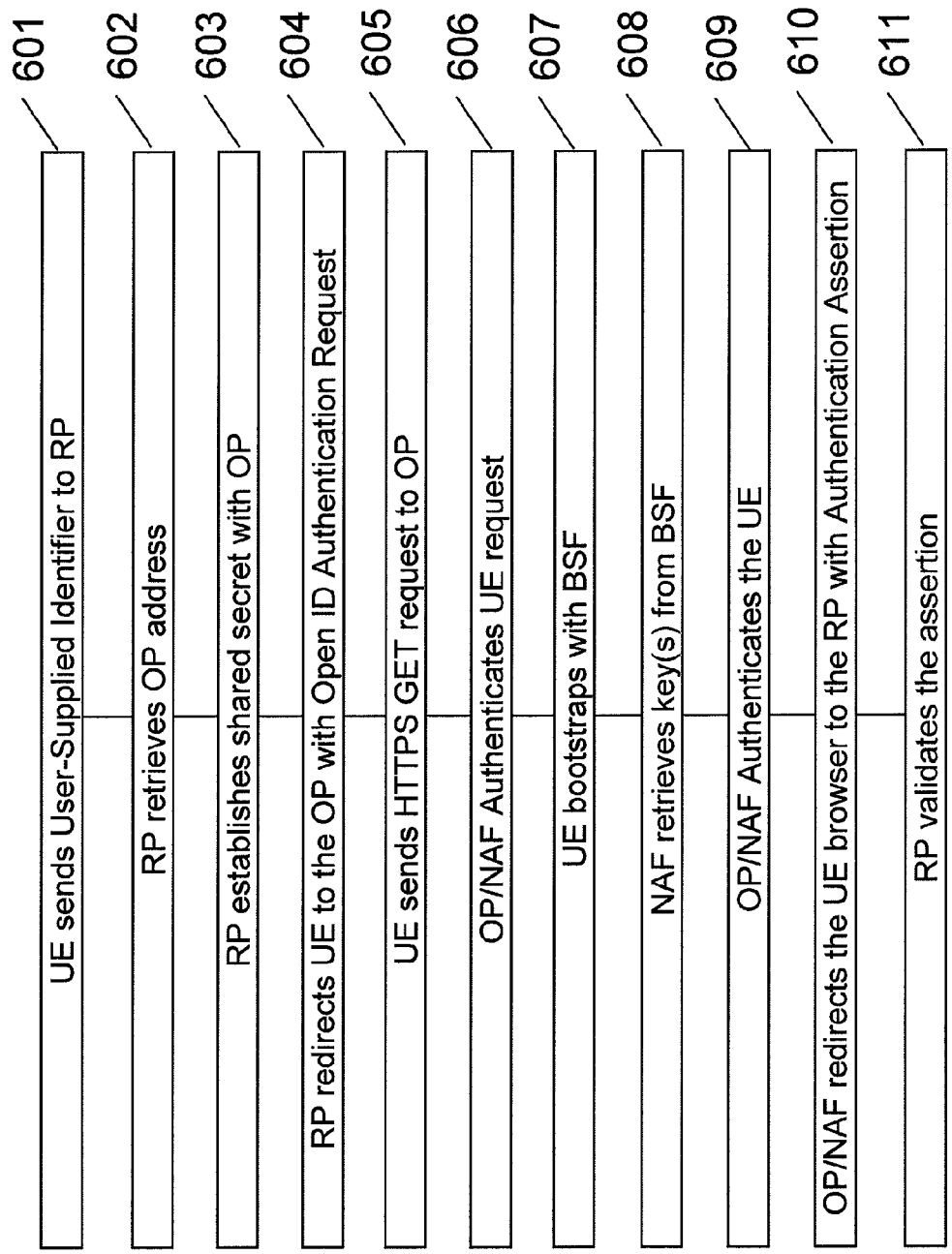
FIG. 6 is a flow chart according to an example method for interworking between a bootstrapping architecture and a shared identity architecture according to an example embodiment of the present invention.

An example method for interworking between a bootstrapping architecture and a shared identity service and, by way of example, between a Generic Bootstrapping Architecture and OpenID architecture is shown in FIG. 6. In this embodiment, the UE sends a User-Supplied Identifier to the RP at block 601. This User-Supplied Identifier may be in the form of a pseudonym or a MSISDN as noted above. The RP of this embodiment then retrieves the OP address at block 602. The RP may then establish a shared secret with the OP at block 603. The shared secret may be established using the Diffie-Hellman Key Exchange protocol and is not required for interworking purposes. The RP of this embodiment then redirects the UE to the OP with an OpenID Authentication Request at block 604. The UE may then send an HTTPS GET request to the OP at block 605. In this embodiment, the OP/NAF authenticates the request from the UE at block 606 and then the UE bootstraps using GBA with the BSF at block 607. The NAF may retrieve the key(s) generated through GBA from the BSF at block 608. The OP/NAF of this embodiment authenticates the UE at block 609 before redirecting the UE browser to the RP with the Authentication Assertion at block 610. The RP then validates the assertion at block 611 and the user may be logged in to the service of the RP.

Another example method for interworking between a bootstrapping architecture and a shared identity service, such as between GBA and OpenID architecture, is shown in FIG. 7. In this embodiment, a service is accessed by a browser, perhaps from a mobile device or other user equipment at block 701. A User-Supplied Identifier, such as an MSISDN or a pseudonym may then be transmitted at block 702. The browser or user equipment device may receive instructions to be redirected to the shared identity provider at block 703. The redirection may include an identity field that contains the pseudonym or an identifier that was determined based on the MSISDN. The user equipment may then provide for transmission of an HTTP GET request at block 704. In response to the HTTP GET request, an authentication is received from the shared identity provider of this embodiment at block 705. Subsequently, the user equipment may then initiate a bootstrapping procedure at block 706. The user equipment may then be redirected to the Relaying Party at block 707, such that the user equipment provides for transmission of an Authentication Assertion to the Relaying Party at block 708. Once authenticated, the secure session with the service may proceed at block 709.

Still another example method for interworking between a shared identity architecture and a bootstrapping architecture is illustrated in the flow chart of FIG. 8. An apparatus, such as the UE, may request service from a relaying party at block

801. The request may include a user-supplied identifier for the single sign-on identifier such as a pseudonym or an MSISDN. A session may then be established with a shared identity provider, such as an OpenID provider, at block 802. A session may then be established with a bootstrapping service function at block 803. Subsequently, the shared identity authentication and the bootstrapping authentication may be transmitted to the relaying party at block 804. A session may then begin with the requested service at block 805.

Another example method for interworking between a shared identity architecture and bootstrapping architecture is illustrated in the flow chart of FIG. 9. The method includes receiving a service request for a shared identity compatible service together with a user-supplied identifier in the form of a pseudonym at block 901. The request may come from a user equipment device. The method further includes obtaining a shared identity provider endpoint URL based on the user-supplied identifier at block 902 and redirecting the user equipment to the shared identity provider with the user-supplied identifier in the identity field as in block 903. The method further includes receiving an authentication assertion from the user equipment including the user-supplied identifier as in block 904. The method also includes validating the authentication assertion as shown in block 905. The user-supplied identifier may be in the form of a pseudonym and the redirecting of the user equipment to the shared identity provider may include including the pseudonym, or a pseudonym-derived identity in the identity field, such as by including the pseudonym or pseudonym-derived identity in the openid-.claimed_id into the openid.identity field. Optionally, the user-supplied identifier may be in the form of an MSISDN, wherein the MSISDN may be read, manually entered, or automatically entered, and wherein the MSISDN may be translated into a shared identity identifier, such as an OpenID identifier. Validating the authentication assertion may include matching of the user-supplied identifier with security settings which may be maintained on a server, for example, a server of the shared identity provider. Further the security settings may include authorization information regarding the type of information that is allowed to be shared, which may be provided by a user or by a service provider. The user security settings may also include a bootstrapping session identifier and the user supplied identifier.

In an example embodiment, an apparatus for performing the method of FIG. 7, 8 or 9 may comprise one or more processors configured to perform some or each of the operations (601-611, 701-709, 801-805, or 901-905) described above. The processor may, for example, be configured to perform the operations (601-611, 701-709, 801-805, or 901-905) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 601-611, 701-709, 801-805, or 901-905 may comprise, for example, corresponding ones of the processor, the memory, and/or circuitry for executing instructions or executing an algorithm for processing information as described above.

An example of an apparatus according to an exemplary embodiment may include at least one processor and at least one memory including computer program code. The at least one memory and the computer program code may be configured to, with the at least one processor, cause the apparatus to perform the operations 601-611, 701-709, 801-805, or 901-905.

An example of a computer program product according to an example embodiment may include at least one computer-readable storage medium having computer-executable program code portions stored therein. The computer-executable program code portions may include program code instructions for performing operations 601-611, 701-709, 801-805, or 901-905.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    causing a request including a user identifier to be provided to a service provider;
    receiving, at a user equipment, a re-direction including the user identifier, wherein the re-direction is to a shared identity service;
    causing, by the user equipment, an authentication request to be provided to the shared identity service shared among a plurality of service providers including the service provider in order to enable a shared identity service authentication, based on the user identifier;
    receiving, at the user equipment in response to the causing the authentication request, the shared identity service authentication;
    establishing a user session security key using at least a generic bootstrapping architecture; and
    establishing a session with the service provider using the user session security key and the shared identity service authentication.

2. The method according to claim 1, wherein the user identifier is a pseudonym.

3. The method according to claim 1, wherein the user session security key is a bootstrapping transaction identifier.

4. The method according to claim 1, wherein the service provider establishes a shared secret with the shared identity service in response to receiving the request.

5. The method according to claim 1, wherein establishing the session with the service provider comprises supplying the user security key to a network application function, receiving authentication information from the network application function in response to supplying the user security key, and providing an authentication assertion to the service provider.

6. An apparatus comprising at least one processor and at least one memory including computer program code, the at least one memory and the computer program code configured to, with the at least one processor, cause the apparatus to perform at least the following:
    cause a request including a user identifier to be provided to a service provider;
    receive a re-direction including the user identifier, wherein the re-direction is to a shared identity service;
    cause, by the user equipment, an authentication request to be provided to the shared identity service shared among a plurality of service providers including the service provider in order to enable a shared identity service authentication, based on the user identifier;

receive, at the user equipment in response to the causing the authentication request, the shared identity service authentication;

establish a user session security key using at least a generic bootstrapping architecture; and establish a session with the service provider using the user session security key and the shared identity service authentication.

7. The apparatus according to claim 6, wherein the request to the service provider includes a user identifier.

8. The apparatus according to claim 7, wherein the user identifier is a pseudonym.

9. The apparatus according to claim 6, wherein the user session security key is a bootstrapping transaction identifier.

10. The apparatus according to claim 6, wherein the service provider establishes a shared secret with the shared identity service in response to receiving the request.

11. The apparatus according to claim 6, wherein establishing a session with the service provider comprises supplying the user security key to a network application function, receiving authentication information from the network application function in response to supplying the user security key, and providing an authentication assertion to the service provider.

12. A computer program product comprising at least one non-transitory computer-readable storage medium having computer-executable program code instructions stored therein which when executed by at least one processor causes operations comprising:

causing a request including a user identifier to be provided to a service provider;

receiving, at a user equipment, a re-direction including the user identifier, wherein the re-direction is to a shared identity service;

causing, by the user equipment, an authentication request to be provided to the shared identity service shared among a plurality of service providers including the service provider in order to enable a shared identity service authentication, based on the user identifier;

receiving, at the user equipment in response to the causing the authentication request, the shared identity service authentication;

establishing a user session security key using at least a generic bootstrapping architecture; and establishing a session with the service provider using the user session security key and the shared identity service authentication.

13. The computer program product according to claim 12, wherein the request to the service provider includes a user identifier.

14. The computer program product according to claim 13, wherein the user identifier is a pseudonym.

15. The computer program product according to claim 12, wherein the user session security key is a bootstrapping transaction identifier.

16. The computer program product according to claim 12, wherein the service provider establishes a shared secret with the shared identity service in response to receiving the request.

17. The computer program product according to claim 12, wherein the establishing the session with the service provider comprises supplying the user security key to a network application function, receiving authentication information from the network application function in response to supplying the user security key, and providing an authentication assertion to the service provider.

* * * * *